OR  3,749,470

United States
Brown et al.

[11] 3,749,470
[45] July 31, 1973

[54] EXTENDED FIELD DEPTH HOLOGRAPHIC METHOD AND APPARATUS

[75] Inventors: Gordon M. Brown, Ann Arbor; Kenneth R. Porter, Pinckney, both of Mich.

[73] Assignee: GCO, Inc., Ann Arbor, Mich.

[22] Filed: Nov. 4, 1968

[21] Appl. No.: 773,127

[52] U.S. Cl. .................................. 350/3.5, 356/112
[51] Int. Cl. .......................................... G02b 27/00
[58] Field of Search ..................................... 350/3.5

[56] References Cited
OTHER PUBLICATIONS

Pennington, "Microwaves," Vol., Oct. 1965 pp. 35–40.
Brooks et al., "IEEE Jour. of Quantum Electronics," Vol. QE-2, No. 8, Aug, 1966, pp. 275–279
"Bell Laboratories Record," Vol. 45, No. 7, July/August 1967 pp. 238–239.

*Primary Examiner*—David Schonberg
*Assistant Examiner*—Ronald J. Stern
*Attorney*—Hauke, Krass, Gifford & Patalidis

[57] ABSTRACT

A hologram is formed by simultaneously exposing a photographic plate to light reflected from an object illuminated by a laser and to a composite reference beam derived from a laser. The composite beam includes two components which have traveled through different path lengths from the laser to the photographic plate but which coincide with one another and emanate from the same spatial filter so as to have the same curvature at the plate. The composite beam is formed by passing the laser beam through an interferometer which divides the beam into two components, and recombines them after they have gone through different path lengths. Since the components have traveled through different distances to arrive at the plate they will be coherent with reflections from separated areas on the object, thereby allowing the photographic plate to record interference patterns with reflections emanating from larger areas of the object than would be possible if only a single component reference beam were employed. After development of the plate, the image may be reconstructed by appropriately illuminating the hologram with any coherent light.

3 Claims, 6 Drawing Figures

PATENTED JUL 31 1973

INVENTORS
GORDON M. BROWN
KENNETH R. PORTER

BY Hauke, Krass, Gifford, & Petalidis
ATTORNEYS

FIG. 3
FIG. 4
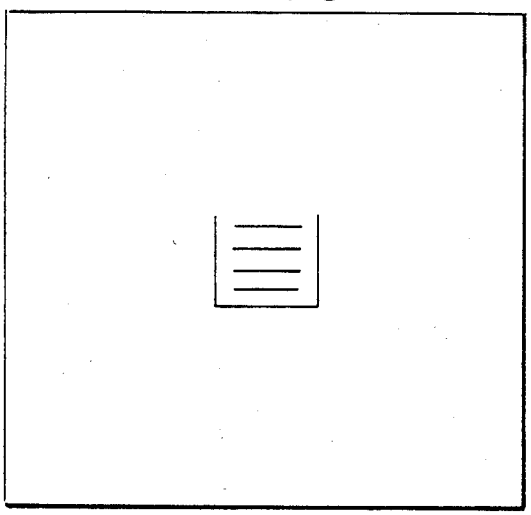
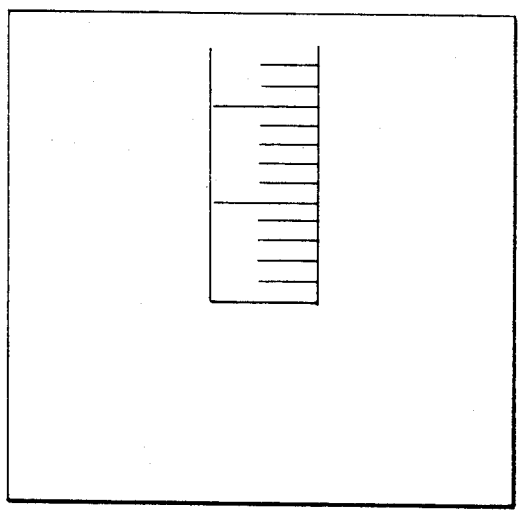
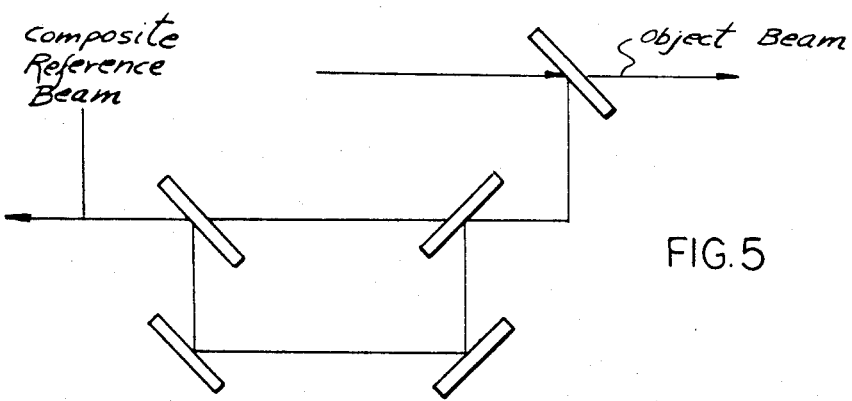
FIG. 5
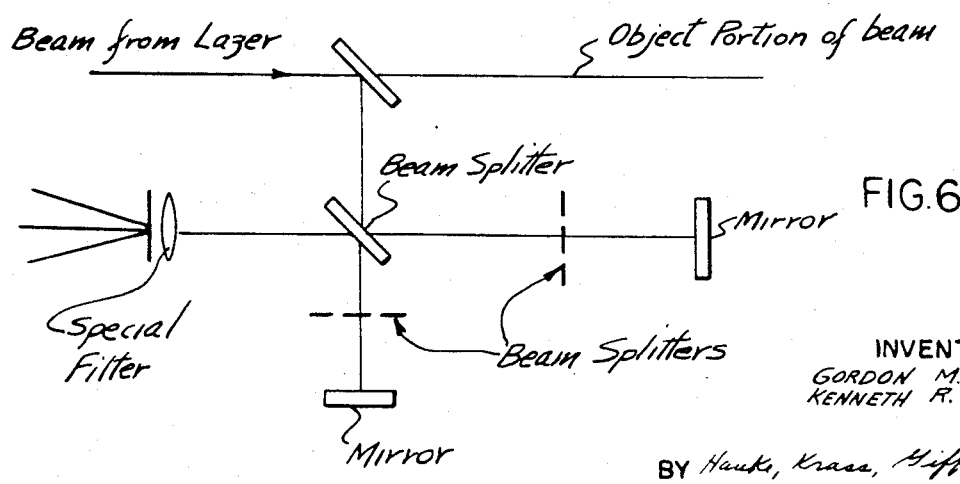
FIG. 6
INVENTORS
GORDON M. BROWN
KENNETH R. PORTER
BY Hauke, Krass, Gifford, + Patalidis
ATTORNEYS

EXTENDED FIELD DEPTH HOLOGRAPHIC METHOD AND APPARATUS

BACKGROUND OF THE INVENTION

1. Field of the Invention

This invention relates to methods and apparatus for forming holograms which store the optical information contained in wavefronts emanating from a member illuminated by coherent light by recording photographically the interference pattern between those wavefronts and the light from the laser, and more particularly to a system and apparatus which allows formation of holograms over object depth of fields which exceed the coherence length of the laser.

2. Prior Art

The light produced by presently available lasers has a coherence which greatly exceeds that of light produced by other available sources, but the laser output is still far from perfectly coherent. The term "coherence" includes several measures of the uniformity or stability of light beam, but considering only that aspect of the term which applies to the phase uniformity of the light produced by a source over a period of time, the laser beam really has a quite limited "temporal" or "longitudinal" coherence. This measure expresses the degree to which the electromagnetic waves produced by a laser source at separated times are in phase with one another. The "coherence length" of the laser refers to the maximum distance along the laser beam in which the waves are within a predetermined limited phase relationship with respect to one another.

When laser light is used to form a hologram this coherence length may be taken as a rough measure of the maximum depth of field which can be achieved in the hologram since light reflected from two points separated from one another by a distance greater than the coherence length will not both coherently interfere with a single reference beam derived from the same source. A number of arrangements have been proposed to overcome this limitation but none have proven successful. Among these has been the idea of dividing the light from the laser into a pair of reference beams which illuminate a photographic medium from separated points and provide a pair of different path lengths between the laser and the photographic medium so that they will be coherent with light derived from points on the object which are separated by distance greater than the coherence length of the laser. The primary difficulty encountered with this technique is the necessity that the resultant hologram be illuminated with exactly the same light arrangement during the reconstruction process in order to insure that the separate interference patterns recorded on the hologram will reproduce images of the same proportion. This results from the size of the reconstructed image being a function of the curvatures of both the reference beam during exposure and the illuminating beam during reconstruction. As a practical manner this requirement has limited use of this coherence extension scheme to laboratory situations wherein the hologram is to be used in the same set up in which it was formed.

SUMMARY OF THE PRESENT INVENTION

The present invention contemplates a method wherein a hologram may be formed of an object having dimensions exceeding the coherence length of a laser from which an optical image of the object area may be constructed employing an ordinary coherent light source, and to apparatus for practicing the method. Broadly the method comprises the formation of a single reference beam having components which have traveled through different path lengths from the laser to the effective beam source. Any point in the composite beam will contain light waves which have emanated from the laser at different times. This beam is projected onto the photographic medium from an effective source point so that all components have the same wavefront curvature. The components of the beam will coherently interfere with light reflected from widely separated points on the object to effectively simultaneously form a plurality of holograms on a single plate. Reconstruction of the optical image of the object after development of the resultant hologram may be achieved by using a normal coherent source since the curvatures of the wavefronts of the components of the reference beam forming the hologram were identical.

The composite reference beam is formed by effectively passing a single beam of laser light through an interferometer type apparatus which divides the beam into two segments and recombines them after they have passed through different path lengths. This composite beam is then projected on the photographic plate through an appropriate lens system, which preferably forms part of a spatial filter, to insure that the wavefronts of the components of the reference beam will have the same curvature at the plate independent of the path length through which the component passes in arriving at the plate. The hologram which results after development of the photographic plate may be illuminated to reconstruct the image of the object in the same manner as a normal hologram using a single source of coherent light. This results from the fact that the ratio of the radius of curvature of the reference beam wavefront and radius of curvature of the reconstructing beam curvatures is constant for all components of the reference beam.

The present invention may also be employed using a composite object beam and a single reference beam, rather than vice versa. Such composite object beam may be derived in exactly the same manner as is the reference beam in the preferred embodiment of the application which is subsequently disclosed.

Apparatus for forming the composite beam may consist of any of a variety of interferometer-like devices. They may generate beams having any number of components which are passed through different distances. It should be recognized that there is an upper limit to the number of beam components which may be employed since each component increases the noise level of the entire hologram while only forming an interference pattern with that portion of the reflected light with which it is coherent.

Other objects, advantages and applications of the present invention will be made apparent by the following detailed description of a preferred embodiment of the invention. The description makes reference to the accompanying drawings in which:

FIG. 3 is an illustration of the object of FIG. 1 as it would appear in reconstruction if the holographic technique of the prior art were employed to form the hologram;

FIG. 4 is an illustration of the object of FIG. 1 as it appears in reconstruction from a hologram formed in accordance with the apparatus of FIG. 1;

FIG. 5 is a schematic diagram of a second alternative form of apparatus for forming a composite beam; and FIG. 6 is a schematic diagram of a third alternative apparatus for forming a composite reference beam.

Figure 1:
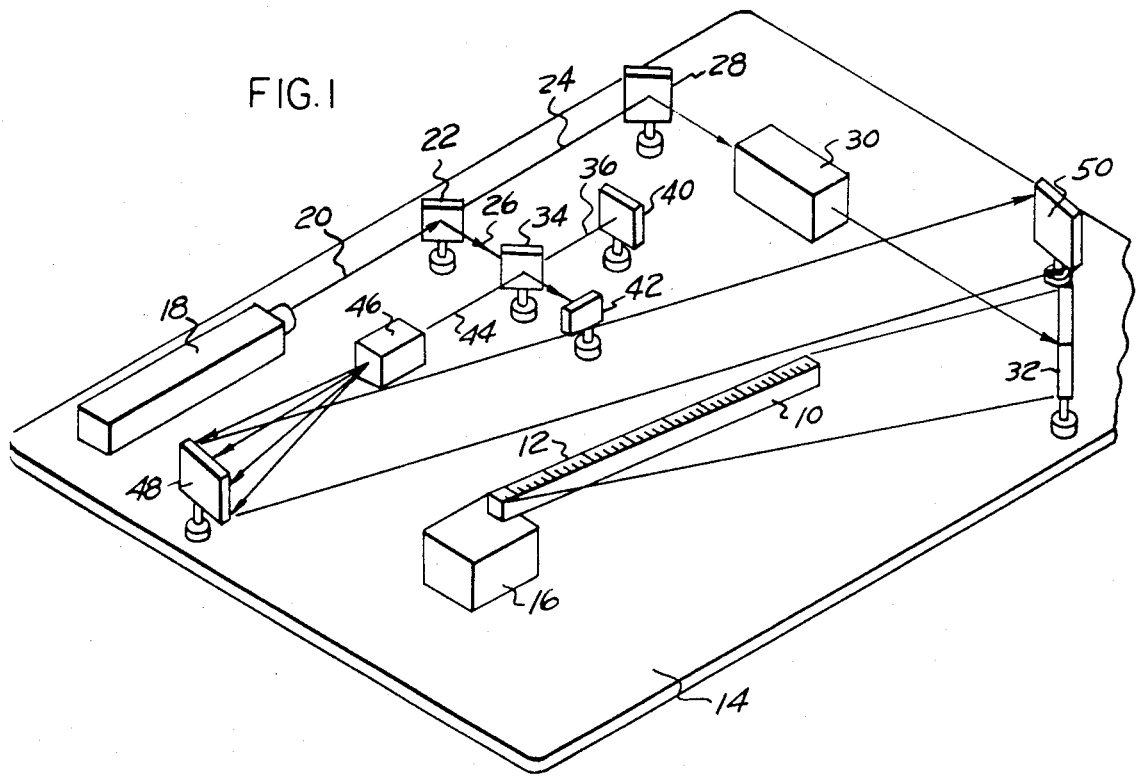
FIG. 1 is a perspective view of a preferred embodiment of inventive apparatus for the practice of the method of the present invention.
Figure 2:
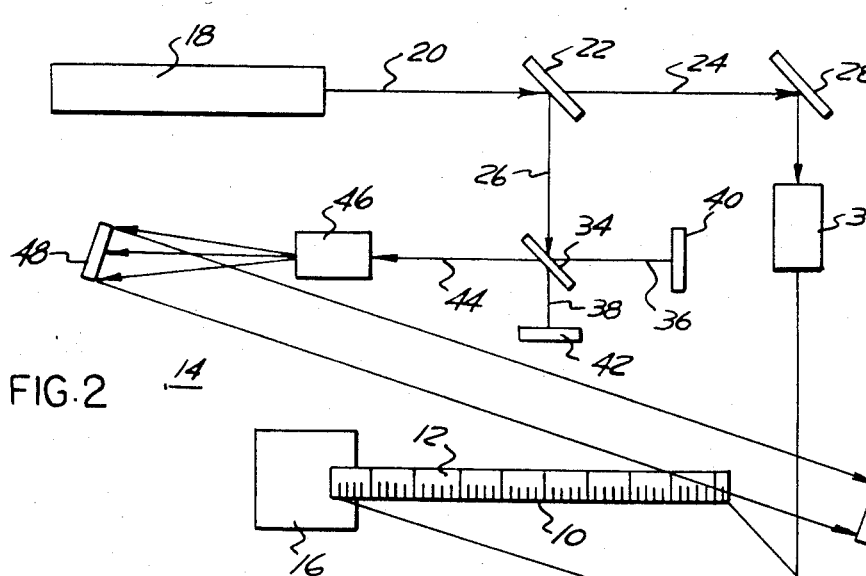
FIG. 2 is a schematic diagram of the apparatus of FIG. 1.

The arrangement illustrated in FIGS. 1 and 2 employs apparatus specially arranged to form a hologram of an object which is chosen to be an elongated rectangular stick 10 having regular gradations 12 on one of its surfaces. One end of the stick is supported on a granite table 14 which also acts as a support for the other apparatus while the other end of the stick is supported above the table top on the raised surface of a block 16 so that the surface of stick 10 having the gradations 12 is supported at an inclined attitude with respect to the table 14.

Coherent light for the holographic process is derived from a continuous wave laser 18 supported on the table generally parallel to the stick 10 but in a horizontal attitude. The laser used has a coherence length of approximately 6 inches. That is to say that relatively high quality interference lines may be observed in an interferometer by comparing two sections of the beam which have traveled through path lengths which do not differ from one another by more than 6 inches.

The output light beam 20 of the laser is first passed through a half silvered mirror or beam splitter 22 which is disposed at approximately 45° with respect to the path of the light beam. The beam splitter 22 causes one section of the beam 24 to continue on its original path and acts to divide out a second section of the beam 26 at right angles to the original beam path.

The beam section 24 is bent through a 90 degree angle by a mirror 28 and then passed through a spatial filter 30 consisting of a pinhole and a lens which projects the beam onto the surface of a second mirror 32 which in turn reflects it over the entire surface of the stick 10 which contains gradations 12.

The beam section 26 is projected on another half silvered mirror 34 to divide out a right angle beam section 36 and to allow a second beam section 38 to continue in the path of the original beam. The beam sections 36 and 38 are respectively reflected back to the half silvered mirror 34 by normally disposed mirrors 40 and 42. The mirror 40 is separated from the beam splitter 34 by approximately 3 inches more than the mirror 42. Thus the beam 36 has traveled through a path length which is 6 inches greater than the path length of the beam 38 by the time they arrive back at the half silvered mirror 34.

The output of the beam splitter 34 is a composite beam 44 having a pair of coincident or collinear components with path lengths which differ from one another by approximately 6 inches, or the coherence length of the laser 18.

This composite reference beam is passed through a second spatial filter 46 and is then reflected by a mirror 48 to a photographic plate 50. The plate 50 is also positioned to receive light reflected from the entire upper surface of the stick 10. The two light systems interfere with one another causing an optical pattern to be recorded on the photographic plate.

The light which is reflected to the photographic plate from the end of the stick 10 nearest to the plate has traveled through a substantially shorter path from the laser than that light which is reflected from the end of the stick farthest from the plate. Light reflected from the near end of the stick will be most coherent with the component of the reference beam having the shorter path length while light reflected from the far end of the stick will be most coherent with the component of the beam having the longer path length.

If only a single component reference beam were employed, as is done in normal holographic procedure, only a portion of the light reflected from the stick would coherently interfere with the reference beam. Employing the technique of the present invention, coherence may be obtained over a substantially greater section of the stick 10.

After exposure of the photographic plate 32, it may be appropriately developed and illuminated with ordinary coherent light to produce the reconstructed image of the section of the stick which is illustrated in FIG. 4. If the distance from the effective source of the light being used during reconstruction to the hologram is the same as the distance of the spatial filter 30 from the photographic plate 32 in the formation process, the apparent image of the stick will have the same size as the image cast by the stick on the photographic plate 32. If the reconstruction and formation distances are different, the stick will appear to have a different size, but in any event those sections of the stick which reflected light which coherently interfered with the different components of the reference beam will appear to have properly related proportions since all the components of the reference beam had the same effective radius of curvature at the photographic plate 32 during the hologram formation process.

FIG. 3 illustrates the reconstructed image of the stick which would be obtained if normal holographic techniques, employing only a single component reference beam were utilized. A much smaller section of the stick is effectively recorded on the hologram because incoherency in the laser beam prevents the obtaining of interference patterns over distances exceeding coherence length of the laser.

While the images stored in holograms formed in accordance with the inventive process may be reconstructed through using a single component beam, if the hologram is to be used in real time holographic processes, whereby interference patterns are obtained between the optical reconstruction of the object and the object itself at a later time, it has been found necessary to illuminate the hologram and the object with the original composite beam during the real time viewing process in order to obtain interference fringe lines. The apparatus of FIGS. 1 and 2, consisting of the beam splitter 34 and the mirrors 40 and 42, essentially comprises a Michelson interferometer. Other interferometer arrangements may be employed in other embodiments of the apparatus. For example, FIG. 5 illustrates an alternate scheme for deriving a dual beam which essentially consists of a Mach-Zender interferometer. Similarly, FIG. 6 schematically illustrates an arrangement of mirrors and beam splitters for deriving a four component beam in which each component is passed through a different path length.

Having thus described my invention, I claim:

1. The method of forming a hologram of an object having a dimension which is greater than the effective coherence length of the light source, the method comprising simultaneously exposing a photographic plate to an object beam reflected from an object illuminated by a coherent light source and a reference beam from said coherent light source, said reference beam having a plurality of components each of which has traveled through a different path length from the coherent light source to the photographic plate and which are collinear with each other and have the same radius of curvature at the photographic plate, whereby said beams coherently interfere with each other at the plate over a depth of field corresponding to points on the object separated by a distance greater than said coherence length and developing the resultant photographic plate.

2. The method of claim 1 wherein the reference beam is passed through a lens and pinhole spatial filter after its components have been made collinear.

3. Apparatus for forming a hologram of an object comprising:
a source of a coherent light beam having an effective coherence length which is less than a dimension of said object; means for dividing said beam into a first section and a second section; means for projecting the first section of the beam onto said object; means for dividing the second section of the beam into a pair of components; means for recombining the pair of components of the second beam in a collinear relationship after they have passed through different path lengths; a photographic medium positioned to receive illumination reflected from said object; and means for projecting the second recombined section onto the photographic medium, whereby the first and second sections coherently interfere with each other at the photographic medium over a depth of field corresponding to points on the object separated by a distance greater than said coherence length, and wherein the means for projecting the second recombined section of the beam on the photographic medium comprises a lens and pinhole spatial filter.

* * * * *